US008096677B2

(12) United States Patent
Fields et al.

(10) Patent No.: US 8,096,677 B2
(45) Date of Patent: Jan. 17, 2012

(54) STAGGERED LED BASED HIGH-INTENSITY LIGHT (75) Inventors: Craig Fields, Chicago, IL (US); Ken Kochman, Arlington Heights, IL (US); Kevin Brennan, Villa Park, IL (US); Tom Papanek, Lake Forest, IL (US)

(73) Assignee: Excelitas Technologies LED Solutions, Inc., Wheeling, IL (US)

( * ) Notice: Subject to any disclaimer, the term of this patent is extended or adjusted under 35 U.S.C. 154(b) by 0 days.

(21) Appl. No.: 12/771,505

(22) Filed: Apr. 30, 2010

(65) Prior Publication Data
US 2010/0220478 A1 Sep. 2, 2010

Related U.S. Application Data (60) Provisional application No. 61/174,785, filed on May 1, 2009.

(51) Int. Cl.
*F21V 7/04* (2006.01)
(52) U.S. Cl. ........................................ 362/231; 362/247
(58) Field of Classification Search .................. 362/230, 362/231, 243, 249.02, 310
See application file for complete search history.

(56) References Cited

U.S. PATENT DOCUMENTS

| 2005/0110649 A1 | 5/2005 | Fredericks et al. |
| 2005/0162845 A1* | 7/2005 | McDermott .................... 362/35 |
| 2007/0081331 A1 | 4/2007 | Wang |

FOREIGN PATENT DOCUMENTS

| EP | 1731423 | 6/2006 |
| EP | 2090820 | 2/2009 |
| GB | 2350176 | 5/1999 |
| WO | WO 9519525 | 7/1995 |
| WO | WO 0249917 | 6/2002 |
| WO | WO 2004070266 | 8/2004 |

OTHER PUBLICATIONS

PCT International Search Report for International Application No. PCT/US2010/033123 dated Jul. 19, 2010 (4 pages).
PCT Written Opinion for International Application No. PCT/US2010/033123 dated Jul. 19, 2010 (8 pages).
European Search Report for International Application No. 09152762.2 dated Jul. 14, 2010 (8 pages).

* cited by examiner

*Primary Examiner* — David V Bruce
(74) *Attorney, Agent, or Firm* — Nixon Peabody LLP

(57) ABSTRACT

A high intensity LED based lighting array for use in an obstruction light with efficient uniform light output is disclosed. The high intensity LED based lighting array has a first concentric ring having a plurality of reflectors and light emitting diodes. The concentric ring has a planar surface mounting each of the plurality of reflectors in perpendicular relation to a respective one of the plurality of light emitting diodes. At least some of the first plurality of reflectors are adjustable relative to the position of the respective light emitting diode to produce a precise beam pattern from the light emitting diode.

20 Claims, 9 Drawing Sheets

STAGGERED LED BASED HIGH-INTENSITY LIGHT

RELATED APPLICATIONS

This application claims priority to U.S. Provisional Application No. 60/174,785 filed on May 1, 2009. This application is a continuation in part of U.S. application Ser. No. 12/370,793 filed on Feb. 13, 2009 which in turn claims priority to U.S. Provisional Application No. 61/065,845 filed on Feb. 15, 2008, all of which are hereby incorporated by reference in their entirety.

FIELD OF THE INVENTION

The present invention relates to high intensity lights, and more specifically to LED-based high intensity obstruction lights.

BACKGROUND OF THE INVENTION

High intensity lights are needed for beacons for navigation and obstruction avoidance. For example, obstruction beacons must be capable of meeting the 20,000 cd requirements for the FAA (US Federal Aviation Authority) L865-L864 standard and the ICAO (International Civil Aviation Organization) Medium Intensity Navigation Lights. In the past, lamps have used conventional strobe lights. However, such lights are energy and maintenance intensive. Recently, lamps have been fabricated using light emitting diodes (LEDs). LEDs create unique requirements in order to be commercially viable in terms of size, weight, price, and cost of ownership compared to conventional strobe lights.

In the example of 20,000 cd beacons, the FAA and ICAO regulations set the following stringent requirements for beam characteristics at all angles of rotation (azimuth). Lights must have effective (time-averaged) intensity greater than 7500 candela (cd) over a 3° range relative to the horizon (elevation). Lights must also have peak effective intensity of 15,000-25,000 cd and effective intensity window at −1° elevation of "50% min and 75% max" for the ICAO only. The ICAO standard sets this "window" of beam characteristics at −1° of elevation and must be met at all angles of rotation (azimuth).

Light devices must also meet the requirements of the FAA compliant version producing 60,000 cd peak intensity in 100 msec flashes. Such lights must also meet the requirements of the ICAO compliant version producing 25,333 cd peak intensity in 750 msec flashes. Ideally, lights can also be combined or configured to provide 2,000 cd red light in addition to the 20,000 cd white light for day and night time operation.

In order to achieve the total light intensity required for an FAA or ICAO compliant light using LEDs, it is necessary to use a large number of LED light sources. However, it is difficult to create a beam with the desired intensity pattern when directing large numbers of LED sources into few reflectors. Furthermore, smaller and therefore more numerous reflectors are needed to conform to overall size restrictions. These constraints all result in a design with a large number of optical elements comprised of individual LEDs and small reflectors. A final challenge is alignment of the multiple optical elements such that their outputs combine to form a beam that is uniform at all angles of azimuth.

Currently, available LED lamps typically stack multiple optical elements symmetrically with no offset, as well as use large reflectors and multiple LEDs per reflector. While such lamps may be compliant, they typically require more than optimal number of LEDs and thus are more complex and expensive.

Thus an efficient LED-based lamp that consistently and readily meets FAA and ICAO standards currently does not exist. An LED lamp that allows the use of relatively smaller reflectors is desirable to meet such standards.

SUMMARY

One disclosed example relates to a high intensity LED-based light with a first concentric ring having a plurality of reflectors and light emitting diodes. The concentric ring has a planar surface mounting each of the plurality of reflectors in perpendicular relation to a respective one of the plurality of light emitting diodes. Some of the first plurality of reflectors are individually adjustable relative to the position of the respective light emitting diode to produce a precise beam pattern from the light emitting diode.

Another example is a high intensity light beacon compliant with FAA and ICAO standards. The light beacon includes a first concentric ring having a first plurality of reflectors and light emitting diodes. The first concentric ring has a planar surface mounting each of the plurality of reflectors in positional relation to a respective one of the plurality of light emitting diodes. Each of the plurality of reflectors is individually adjustable relative to the position of the respective light emitting diode to produce a precise beam pattern from the light emitting diode. A second concentric ring is mounted on the first concentric ring. The second concentric ring has a second plurality of reflectors and light emitting diodes. The second concentric ring has a planar surface mounting each of the plurality of reflectors in perpendicular relation to a respective one of the plurality of light emitting diodes. The second plurality of reflectors and light emitting diodes are offset from the reflectors and light emitting diodes of the first concentric ring. A third concentric ring is mounted on the second concentric ring. The third concentric ring has a third plurality of reflectors and light emitting diodes. The third concentric ring has a planar surface mounting each of the plurality of reflectors in perpendicular relation to a respective one of the plurality of light emitting diodes. The third plurality of reflectors and light emitting diodes are offset from the reflectors and light emitting diodes of the second concentric ring. A fourth concentric ring is mounted on the third concentric ring. The fourth concentric ring has a fourth plurality of reflectors and light emitting diodes. The fourth concentric ring has a planar surface mounting each of the plurality of reflectors in perpendicular relation to a respective one of the plurality of light emitting diodes. The fourth plurality of reflectors and light emitting diodes are offset from the reflectors and light emitting diodes of the third concentric ring.

Another example is an optical element for use in a light. The optical element includes a light emitting diode and a reflector having a reflective surface. The reflective surface is shaped to emit a specific beam pattern from light reflected from the light emitting diode. The reflector includes a positioning member allowing the reflector to be adjusted between positions relative to the light emitting diode.

Additional aspects will be apparent to those of ordinary skill in the art in view of the detailed description of various embodiments, which is made with reference to the drawings, a brief description of which is provided below.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Figure 1:
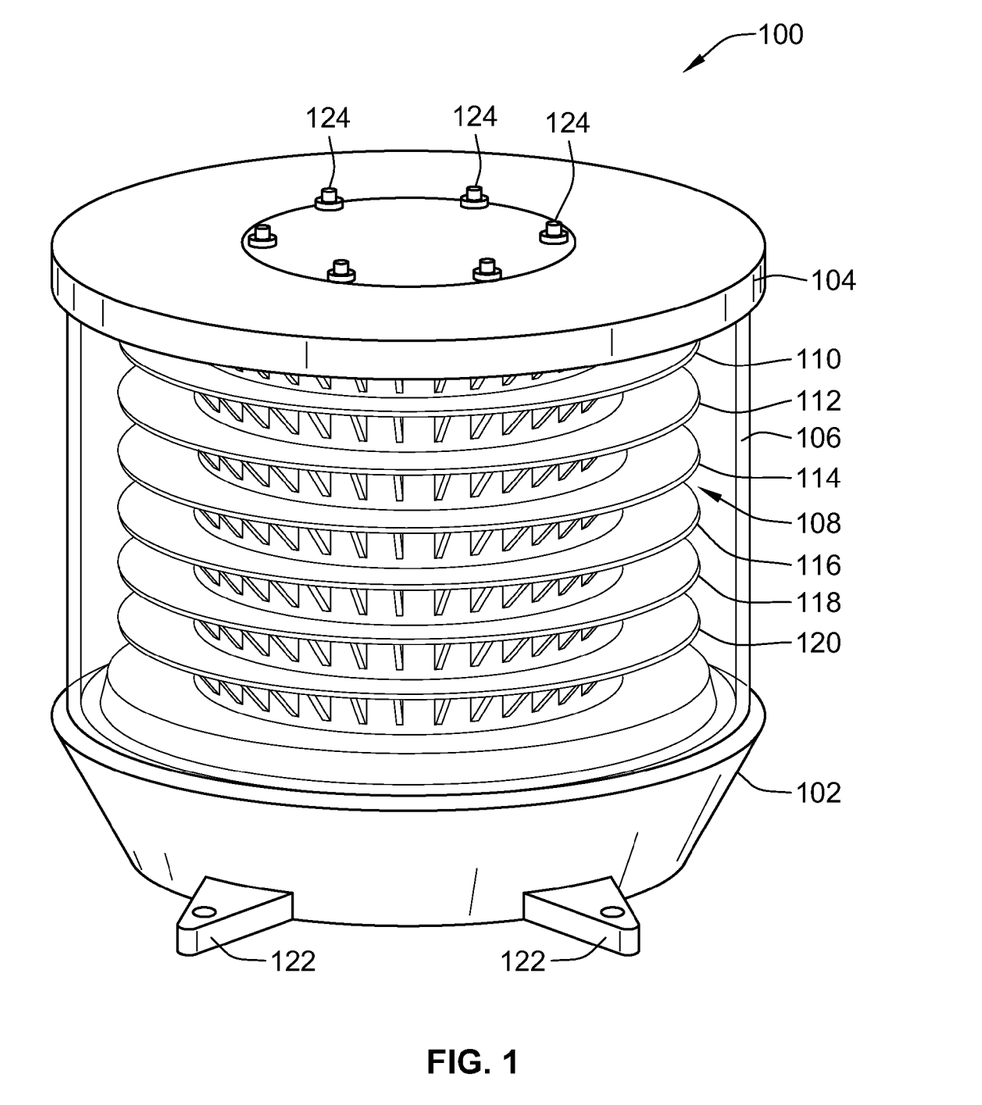
FIG. 1 is a perspective diagram of an example staggered LED high intensity light.

FIG. 1 shows an example high intensity LED-based light 100. The LED-based lamp may be used as an aircraft beacon obstruction light and may be compliant with applicable FAA and ICAO standards. The high intensity LED-based light 100 has a base 102, a top housing 104, and a transparent cylindrical housing 106. The base 102, top housing 104, and transparent cylindrical housing 106 enclose a lighting array 108. The base 102 and top housing 104 provide support and alignment for the lighting array 108 while allowing heat to be transferred from the LEDs and power supplies in the lighting array 108 to the ambient surroundings.

The lighting array 108 has a series of concentric lighting rings 110, 112, 114, 116, 118, and 120 that will be detailed below. As shown in FIG. 1, the concentric lighting rings 110, 112, 114, 116, 118, and 120 are arrayed in a vertical stack with the concentric lighting ring 110 at the top of the stack and the concentric ring 120 at the bottom of the stack.

The cylindrical housing 106 is a generally cylindrical transparent housing that protects the optical elements on the concentric lighting rings 110, 112, 114, 116, 118, and 120 while allowing the transmission of light generated by the optical elements on the concentric lighting rings 110, 112, 114, 116, 118, and 120.

The base 102 is generally cylindrical in shape and contains wiring, power supplies, and controls for the optical elements of the concentric lighting rings 110, 112, 114, 116, 118, and 120. The base 102 has a plurality of mounting points 122 that allow the light 100 to be mounted on a flat surface. The top housing 104 includes a number of bolts 124 that are attached to rods (not shown) extending throughout the concentric lighting rings 110, 112, 114, 116, 118, and 120. The bolts 124 cap the rods and hold the rods to attach the top housing 104 to the base 102. The rods align the rings 110, 112, 114, 116, 118, and 120 in place as will be explained below.

Figure 2:
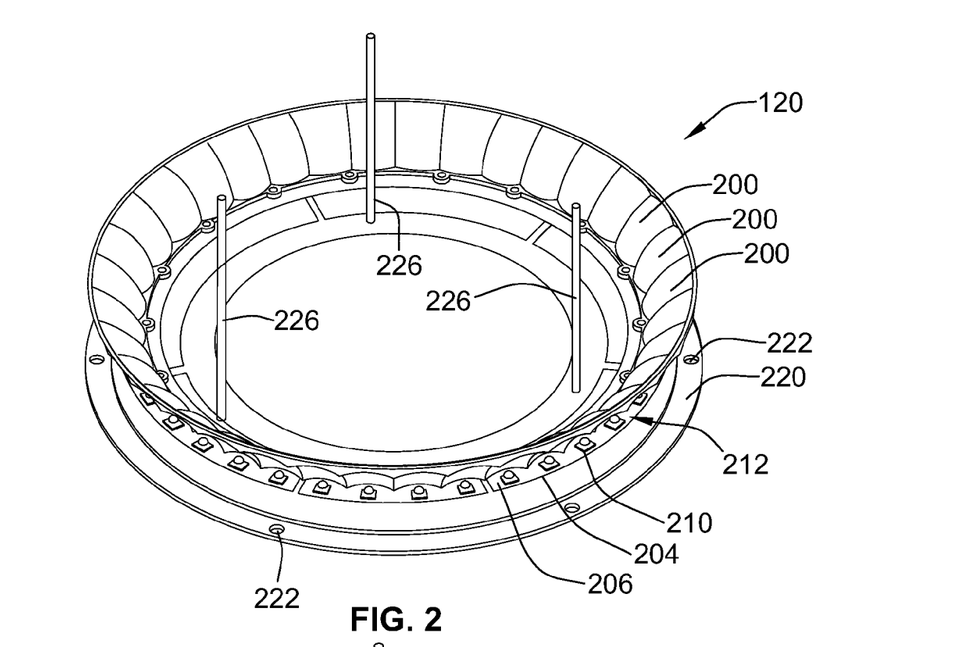
FIG. 2 is a perspective view of the bottom concentric ring of LEDs and reflectors of the LED high intensity light in FIG. 1.

FIG. 2 is a perspective view of the bottom concentric lighting ring 120 of FIG. 1. The concentric lighting ring 120 has multiple optical elements 200 that emit light from the entire circumference of the concentric lighting ring 120. The concentric lighting ring 120 supports and aligns the optical elements 200 around the entire circumference of the concentric lighting ring 120 as shown in FIG. 2. The concentric lighting ring 120 has a circular base member 202 with a ring shaped top surface 204. In this example, six of the optical elements 200 are mounted on an arc-shaped supporting circuit board 206. In this example, there are 36 total optical elements 200 in the concentric lighting ring 120 mounted on six supporting circuit boards 206. The thirty-six (36) optical elements 200 arrayed around the concentric lighting ring 120 are arranged so that each optical element 200 (LED 210 and reflector 212) occupies 10° of the circumference of the concentric lighting ring 120. Of course it is to be understood that different numbers of optical elements and circuit boards may be used. Each of the optical elements 200 has an LED 210 and a reflector 212. The supporting circuit board 206 serves to support and align the LEDs 210 and the reflectors 212. The circuit board 206 transfers heat from the LEDs 210 to the base member 202 and direct electrical power to the LEDs 210 via power supplies in the base 102 in FIG. 1. In this example, the supporting circuit board 206 is a thermally conductive printed circuit board (PCB), having a metal core of aluminum or copper. The LEDs 210 are preferably attached to circuit board 206 using solder, eutectic bonding, or thermally conductive adhesive. The supporting circuit board 206 may have physical registration features such as holes or slots that allow the reflectors 212 to be aligned or centered optically with each of the LEDs 210.

The base member 202 includes an outer mounting ring 220 that includes a number of holes 222. The holes 222 allow the fixing of the concentric lighting ring 120 to the base 102 in FIG. 1 via bolts (not shown). The base member 202 also includes an inner mounting ring 224 which may be separate or an integral part of base member 202. The inner mounting ring 224 accommodates a number of alignment rods 226 that extend upwards from the concentric lighting ring 120 to align the further concentric lighting rings 110, 112, 114, 116, and 118 in FIG. 1.

Figure 3:
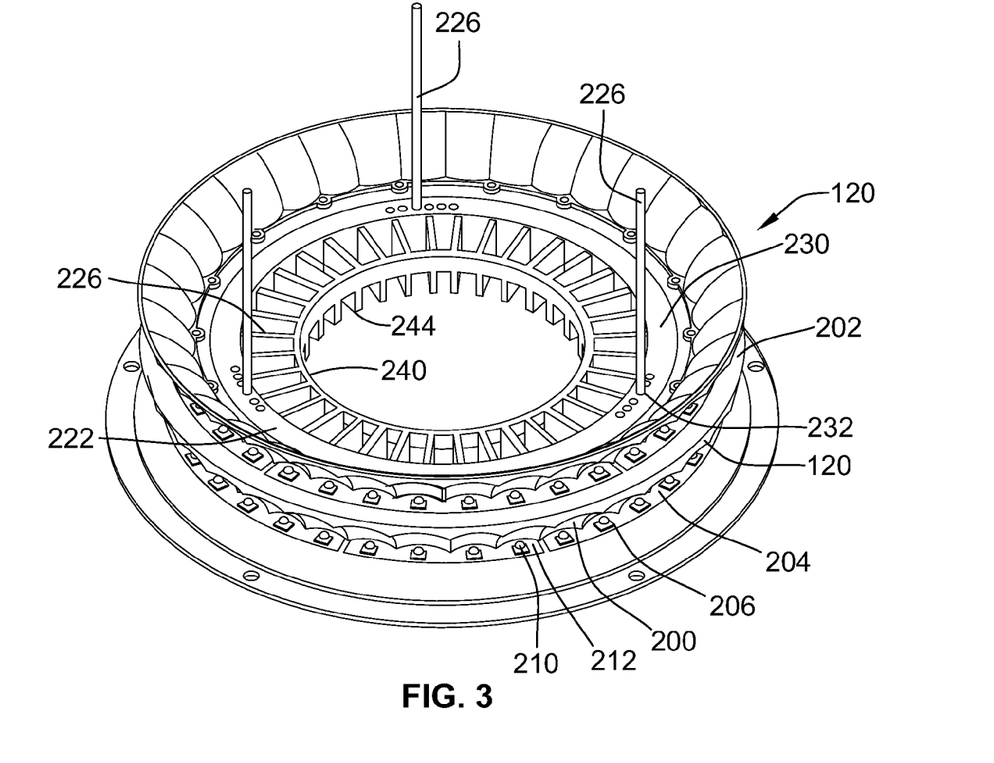
FIG. 3 is a perspective view of two of the concentric rings of LEDs and reflectors of the LED high intensity light of FIG. 1.

FIG. 3 shows a perspective view of the concentric rings 120 and 118 assembled with each other. In FIG. 3, identical elements in the concentric ring 118 to those in the concentric ring 120 are given the same element numbers. Similar to the bottom concentric ring 120, the concentric lighting ring 118 has a circular base member 202 with a ring-shaped top surface 204 supporting six supporting circuit boards 206. The circuit boards 206 mount 36 total optical elements 200 so that each optical element 200 (LED 210 and reflector 212) occupies 10° of the circumference of the concentric lighting ring 118.

The concentric lighting ring 118 has an inner mounting ring 230. The inner mounting ring 230 has a series of alignment holes 232 that are staggered approximately 1.6667 radial degrees from each other. In this example, there are six alignment holes 232 in each group of holes (resulting in six layers of 36 LEDs of a single color), but it is to be understood that different numbers of alignment holes may be used and such holes may be spaced at different angles from each other. The alignment rods 226 are inserted through corresponding holes 232 in each of the three groups to offset the concentric lighting ring 118 from the bottom concentric lighting ring 120 by 1.6667 radial degrees. This arrangement results in each of the optical elements 200 in the bottom concentric lighting ring 120 to be offset from each of the optical elements 200 in the next concentric lighting ring 118 by 1.6667 radial degrees. The other concentric lighting rings 110, 112, 114, and 116 are identical to the concentric lighting ring 118 and are similarly offset from each other.

The concentric lighting ring 118 also has a heat sink 240 that is thermally coupled to the inner mounting ring 230 and may be a separate part or integral with ring 118. The heat sink 240 has a number of radially extending vanes 242 that are mounted between the inner mounting ring 230 and a central ring 244. The supporting circuit boards 206 may have physical registration features, such as a tab or a slot that fix its radial position on the base member 202 and the heat sink 240. The heat sink 240 allows heat from the circuit boards 206 to be dissipated.

Figure 4:
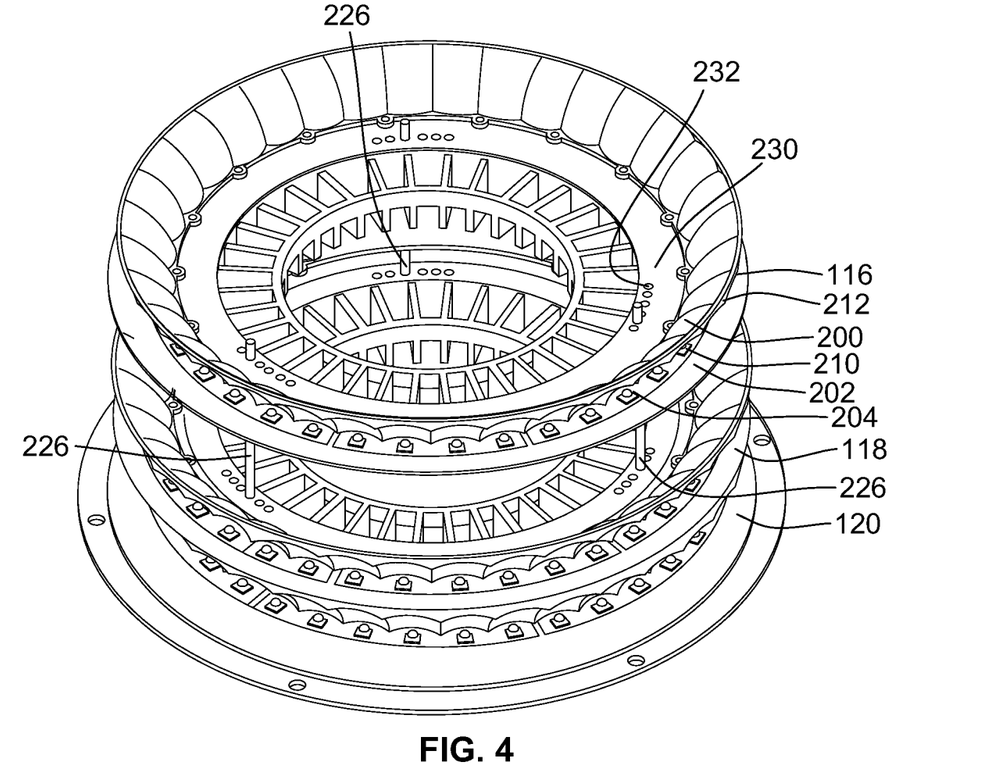
FIG. 4 is a perspective view of the addition of a third concentric ring of LEDs and reflectors to the two concentric rings of the LED high intensity light of FIG. 1.

FIG. 4 is a perspective view of the assembly of the bottom concentric lighting ring 120 and the concentric lighting ring 118. FIG. 4 shows the concentric lighting ring 116 before assembly to the concentric lighting rings 118 and 120. In FIG. 4, identical elements in the concentric ring 116 to those in the concentric rings 118 and 120 are given the same element numbers. Similar to the concentric ring 118, the concentric lighting ring 116 has a circular base member 202 with a ring-shaped top surface 204 supporting six supporting circuit boards 206. The circuit boards 206 mount 36 total optical elements 200 so that each optical element 200 (LED 210 and reflector 212) occupies 10° of the circumference of the concentric lighting ring 116.

As shown in FIG. 4, the concentric ring 116 is aligned to be offset from the concentric ring 118 by using different alignment holes 232 in conjunction with the alignment rods 226. The concentric ring 116 is aligned in the proper offset and is dropped on the concentric ring 118 using the alignment rods 226 as guides. The use of the alignment rods 226 prevent tolerance stacking and allow proper alignment of the offsets between the concentric rings 110, 112, 114, 116, 118, and 120.

Heat is removed from the LEDs 210 in the optical elements 200 in the concentric rings 110, 112, 114, 116, 118, and 120 via conduction through the circuit boards 206, through conductive grease or adhesive to the heat sink 240. Each heat sink 240 has a sufficient mating surface to the heat sinks 240 in the above or below concentric lighting ring and also can use thermal grease to reduce thermal contact resistance. Heat is conducted through the rings 110, 112, 114, 116, 118, and 120 to a lower plate attaching the concentric lighting rings to the base 102. Heat in the bottom concentric ring 120 is transferred to the base 102 and may then be conducted to the mounting surface, or transferred by convection to the ambient air. Heat may also be removed by a conductive or convective path to the top housing 104. Heat may also be removed convectively from the heat sinks 240 by adding fins on the rings and using a circulating fan. Radiative heat losses can be enhanced by applying surface treatments such as paint to the top housing 104, bottom plate, and base 102.

Figure 5:
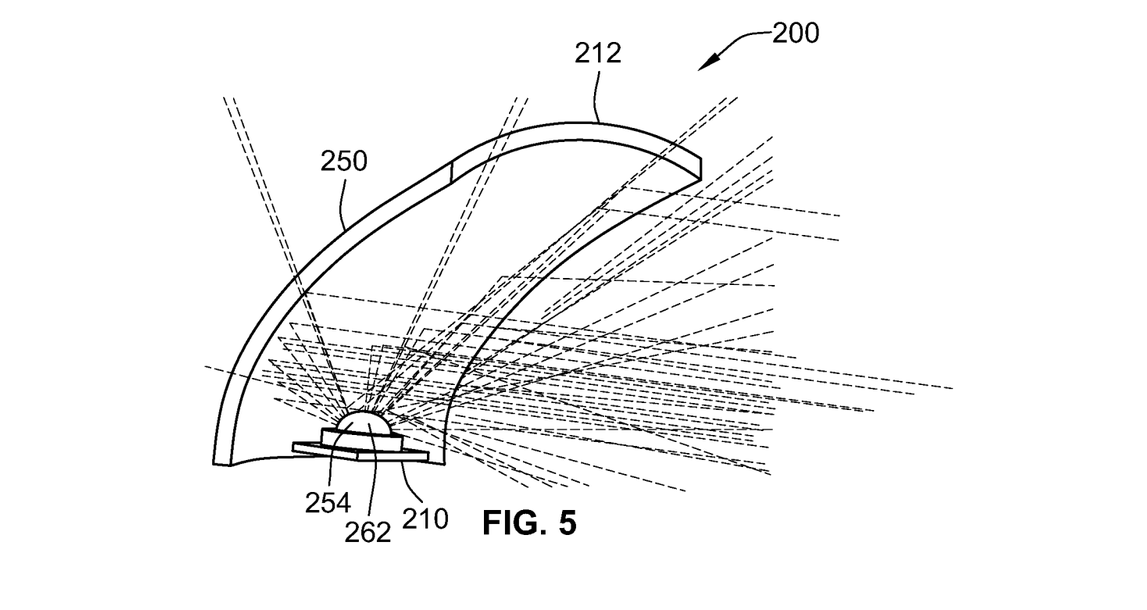
FIG. 5 is a perspective view of and ray trace from an optical element having a single LED and reflector mounted on one of the concentric rings of the intensity light of FIG. 1.

FIG. 5 is a close up perspective view of the optical element 200 that is installed on each of the concentric rings 110, 112, 114, 116, 118, and 120 in FIG. 1. Each of the optical elements such as the optical element 200 includes the LED 210 and the reflector 212. The LED 210 is vertically oriented in relation to the reflector 212. In this example, the LED 210 is a high-brightness white LED such as an XLamp XREWHT 7090 XR series LED available from Cree. Alternatively different color LEDs such as a red LED may be used. The reflector 212 has an optical surface 250. The optical surface 250 of the reflector 212 may have multiple curved surfaces. Alternatively, the optical surface 250 may have one or more parabolic surfaces, though other surface geometries such as elliptical or hyperbolic may be used, as well as various combinations of such curved surfaces such as conic, aspheric, anamorphic, or faceted may be used. The reflector 212 is designed to form a horizontal (azimuth) beam approximately 5° to 10° wide at its half-maximum intensity. The reflector 212 is constructed of plastic in this example and molded in clusters of six reflector elements per cluster. The reflector 212 is coated with aluminum or other highly reflective material.

The LED 210 includes an enclosure unit 252 that includes a lens 254. By using a power LED package that includes the lens 254 providing a moderate degree of collimation, the size of the required reflector 212 can be minimized, allowing the practical use of one individual reflector 212 per LED 210. Of course, using a non-collimated or near-lambertian LED may be used, but would either lead to generally larger reflector surfaces to capture sufficient light or have a lower efficiency.

The vertical orientation of the LED 210 causes the majority of the light from the LED 210 to hit a reflecting surface such as the optical surface 250 of the reflector 212 before exiting the optical element 200. This ensures that the majority of the light has been controlled by a designed surface as shown by the rays in FIG. 5. The vertical orientation also allows use of a smaller reflector for optical beam shaping. The optical surfaces of each individual reflector 212 are optimized for a single LED 210. The reflector surfaces are designed to form the vertical (elevation) collimation required and to form the desired horizontal (azimuth) beam.

As shown in FIGS. 3 and 4, each of the concentric lighting rings 110, 112, 114, 116, 118, and 120 are rotationally offset from each other resulting in the respective optical elements 200 to be staggered from each other. The offset position of the concentric rings results in their respective optical elements 200 to have combined beam patterns of light intensity in relation to elevation closely matched at all angles of azimuth so that the combined beams will lie within the allowable "windows" of the ICAO and FAA requirements for the example light 100 in FIG. 1. A plot of intensity versus azimuth angle at a fixed angle of elevation for the combined optical elements 200 will show minimal variation, or "ripple." "Ripple" is herein defined as the peak-to-peak variation in intensity relative to the average intensity at all angles of azimuth. Sources of ripple along the azimuth can be attributed to two categories: superposition errors and LED errors. Superposition errors include: mechanical errors and misalignments in construction, optical tolerances, and optical surface design deficiencies. LED errors include: flux or intensity variations, and beam shape variations, both are LED to LED issues. Also included in LED errors is LED model error, which is the difference between optical beam properties of real LED's and the optical model of the LED's used during optical design. Radial stagger between rings minimizes the ripple from both of the sources of ripple. Minimum ripple allows the high intensity light 100 to feasibly meet the FAA and ICAO requirements. Further, the drive current and/or the number of LEDs necessary to achieve minimum intensity at all points is reduced.

Figure 6:
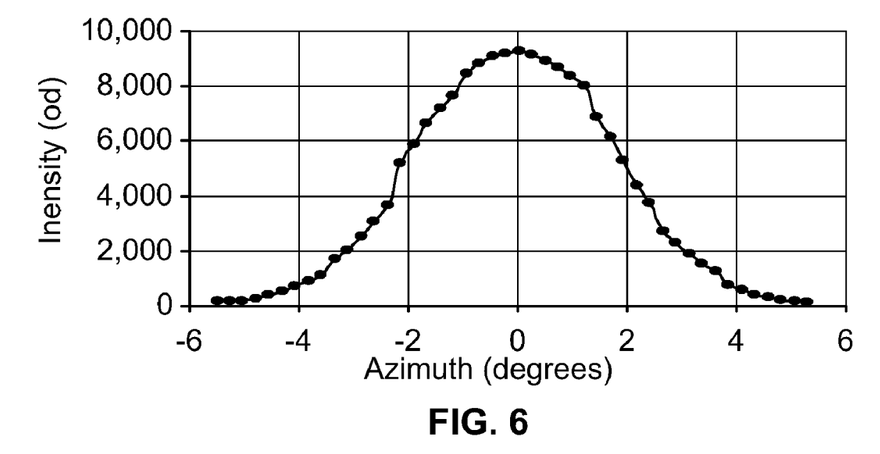
FIG. 6 is a graph of the measured light output from an optical element of FIG. 5.

FIG. 6 shows the measured light from a single typical LED-reflector optical element such as the optical element 200 in FIGS. 2-3. FIG. 6 is a graph showing intensity versus azimuth angle at a fixed elevation angle. As explained above, a single row of the elements 200 are at radial intervals of 10° within the diameter of a concentric ring such as the concentric ring 120 shown in FIG. 2. A second ring of the optical elements 200 such as the concentric ring 118 fills in the "gaps" (regions of low light intensity) from the first ring 120 as shown in FIGS. 2-3. To then achieve the desired total light output, a minimum of three of these ring pairs is required.

Figure 7:
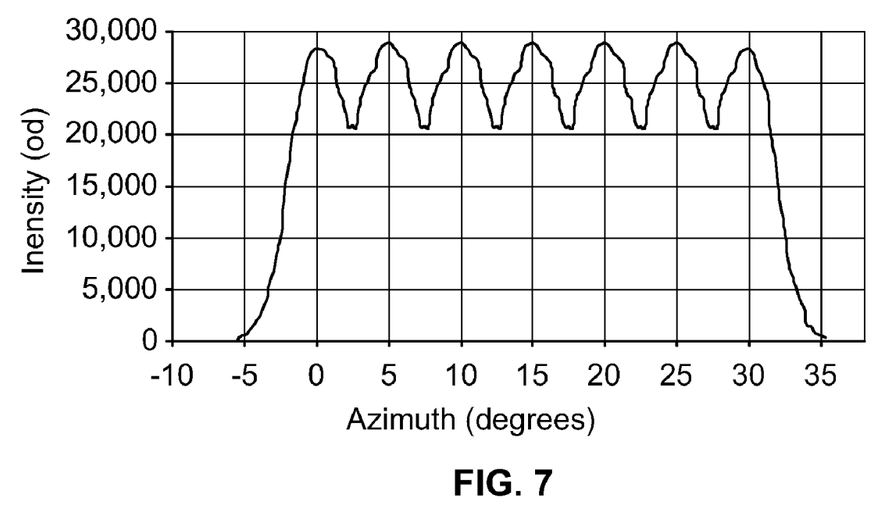
FIG. 7 is a graph showing the beam pattern from one group of the optical elements of staggered concentric rings using an offset angle of 5 degrees.

FIG. 7 is a graph showing the beam pattern from one group of the optical elements of two staggered concentric rings using an offset angle between rings of 5 degrees. As the graph in FIG. 7 shows, there is less variation ("ripple") in intensity as a function of azimuth angle, but the gaps in one row's output is not fully filled by the offset row. This is because the 50% azimuth intensity amplitude points and slopes of the individual optical elements are not ideal, and the ripple is still a significant percentage of the average azimuth value.

Figure 8:
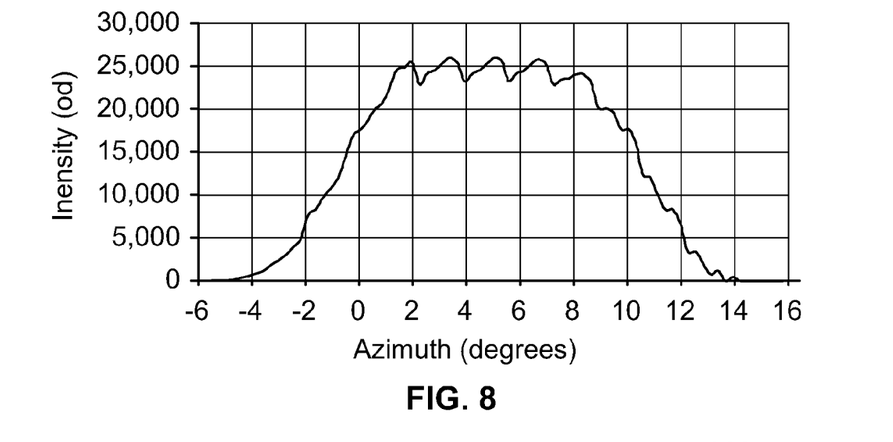
FIG. 8 is a graph showing the beam pattern from one group of the optical elements of the staggered concentric rings of the intensity light of FIG. 1.

FIG. 8 is a graph showing the beam pattern from one group of the optical elements of six staggered concentric rings of the intensity light 100 of FIG. 1. The offset ("stagger") has been optimized for the six concentric rings 110, 112, 114, 116, 118, and 120 of optical elements 200 to 1.667° per ring (10° per element divided by six rings). The calculated variation in output ("ripple") is now greatly reduced. This further reduces any residual ripple in the reflector-LED design by not having ripple repeated or reinforced three times, once by each layer. Other offsets can be calculated using different numbers of rows or optical elements per row using this method. The radial offset between concentric rings is roughly equal to 360 degrees divided by the number of LEDs per layer divided by the number of layers of a given color. A reflector design that has a 50% azimuth beam width of 10° could also be envisioned that would allow for a complete filling of the azimuth in one layer instead of two as mentioned above. This also allows layers to be staggered to minimize ripple, and could allow some flexibility for differing intensity requirements. Reflector designs could also be further optimized so that the summation of intensities, as illustrated in FIGS. 7-8, has even less ripple variation.

A number of variations may be made on the example high intensity light 100 in FIG. 1. The light 100 could be modified with an additional concentric ring of red LEDs. With an additional concentric ring of red LEDs, the light could be used in either daytime (using the optical elements in the six concentric rings) or nighttime using the concentric ring of red LEDs.

Figure 9:
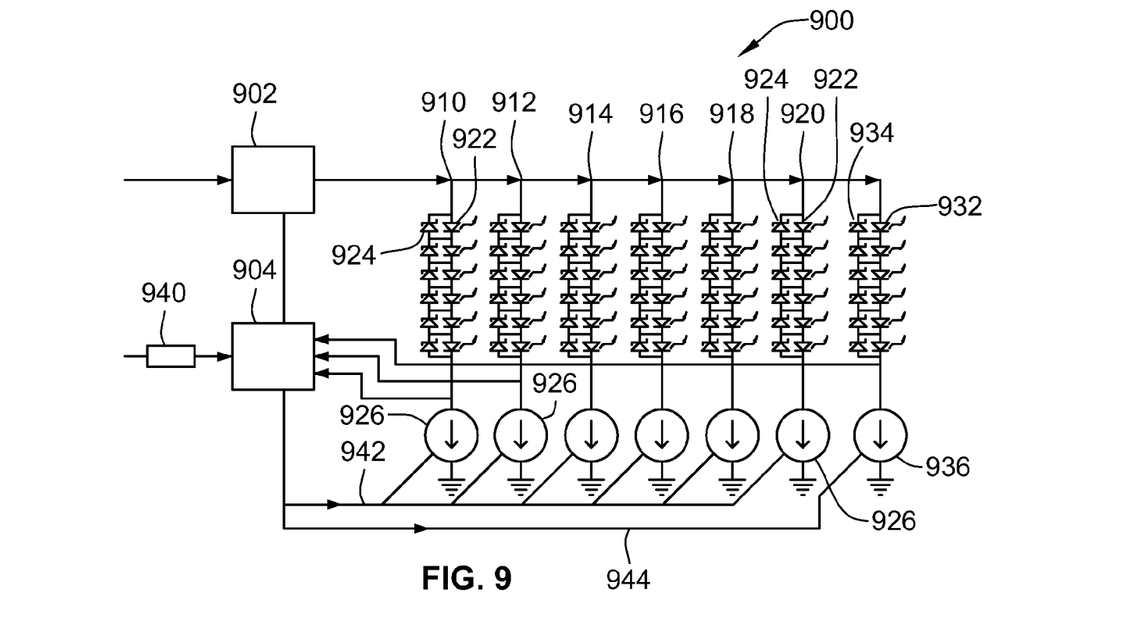
FIG. 9 is a circuit diagram of an electronic system for a second example of a staggered LED high intensity light.

An example of such a variation is shown in FIG. 9. FIG. 9 is a block diagram of an electric control system 900 for one segment of a high intensity LED-based light that has both daytime and nighttime capabilities in accordance with FAA and ICAO requirements. In this example, the electric control system 900 provides electrical control for 42 LEDs that are divided into six LEDs and corresponding reflectors on each of seven concentric rings. There are five other similar control systems to electric control system 900 that make up the entirety of a high intensity LED-based light. The electric control system 900 includes a power supply 902 and a timing and control module 904. The power supply 902 supplies power to six circuit boards 910, 912, 914, 916, 918, and 920 that are similar to circuit boards 206 on the concentric rings 110, 112, 114, 116, 118, and 120 in the light 100 in FIG. 1. Each of the six circuit boards 910, 912, 914, 916, and 920 have six, high intensity, white LEDs 922 that are wired in parallel with a zener diode 924 to bypass current on the respective white LEDs 922 in the event of an open failure. Each of the circuit boards 910, 912, 914, 916, 918, and 920 are coupled to a constant current source 926. Of course other series and parallel wiring configurations of the LEDs may be made.

The electric control system 900 also includes another circuit board 930 that has a series of high intensity red LEDs 932. The red LEDs 932 are each coupled in parallel with a zener diode 934 to bypass current on the respective red LEDs 932 in the event of an open failure. The circuit board 930 is coupled to a constant current source 936.

The electric control system 900 is appropriate for an obstruction lamp that may be employed during both daylight and nighttime. Daytime use requires brighter light in the form of at least the optical elements emitting white light of six concentric rings similar to the concentric rings 110, 112, 114, 116, 118, and 120 in the light 100 in FIG. 1. Nighttime use requires at least a single concentric ring of red LEDs having multiple circuit boards such as the circuit board 930 in FIG. 9. A daylight sensor 940 is coupled to the timing and control module 904. The daylight sensor 940 may be mounted on an exterior surface of the light, for example on the top housing 104 of the light 100 in FIG. 1. The signals received from the daylight sensor 940 enable the timing and control module 904 to activate either a daytime or nighttime mode. In the daytime mode, control pulses are sent to the current sources 926 to pulse the white LEDs 922 on and off via a control line 942. In the nighttime mode, control pulses are sent to the current source 936 to pulse the red LEDs 932 on and off via a control line 944. In addition, lines may be coupled from the strings of LEDs 922 and 934 to the timing and control module 904 to sense the voltage across the LEDs 922 and 934 to detect open failures. The timing and control module 904 may be programmed to alert an operator of such a failure.

The optical elements 200 could also be modified with other reflector geometry. Further, side-firing LEDs directed back into a reflector could be used for the optical elements 200. The reflectors could also be reflectors combined in groups. Also, multiple LEDs may be used for each reflector. Staggered TIR optics could be used for the reflectors. Different numbers of LEDs per ring and different number of rings may also be used. An equivalent linear light with similar staggered sources could be used. An electrical control system with adjustable current for each LED or group of LEDs could be used to further reduce variations in beam intensity and uniformity.

Figure 10:
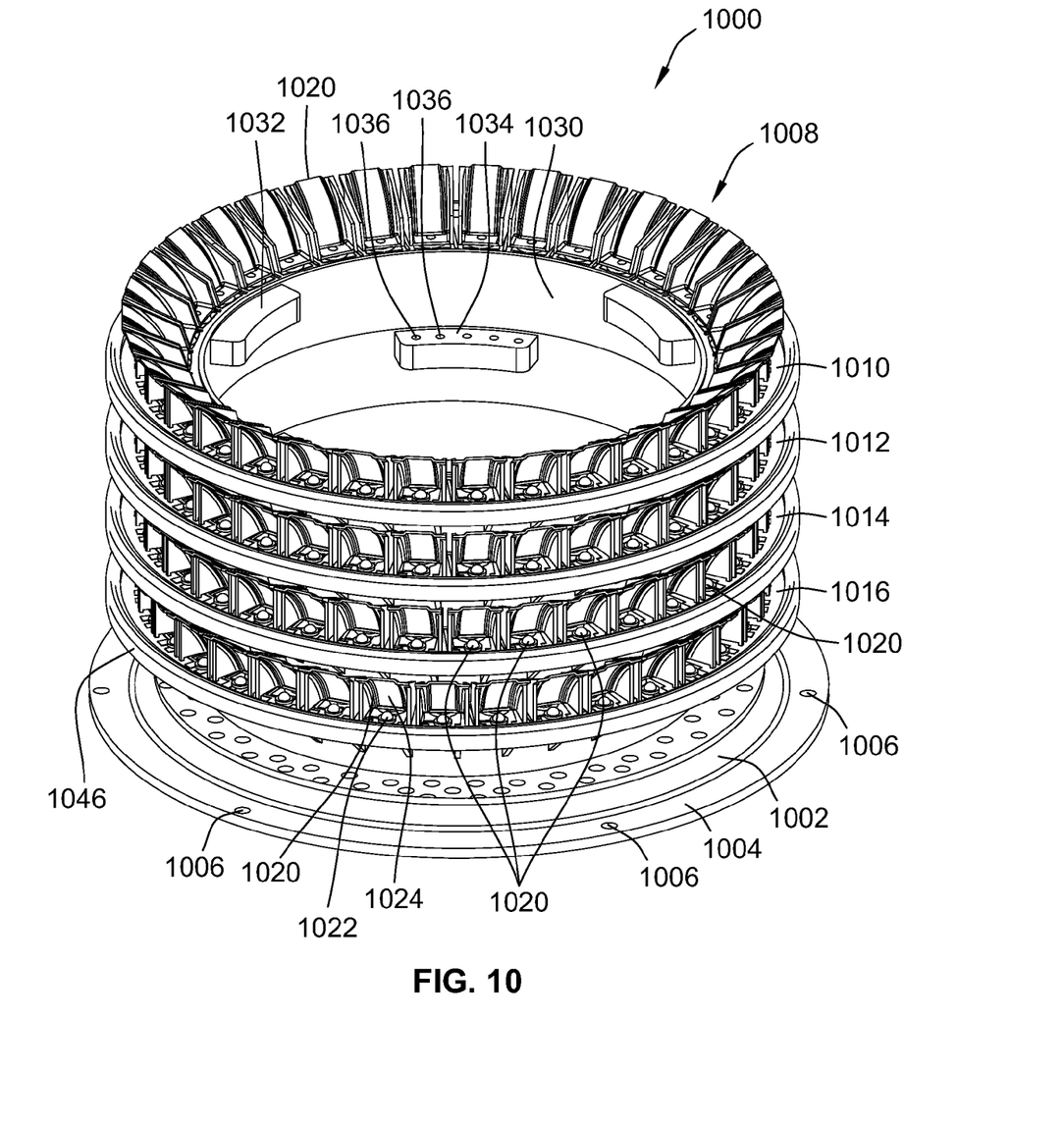
FIG. 10 is a perspective diagram of a light engine of a second example of a staggered LED-based high intensity light.

FIG. 10 shows a perspective view of a second example of a light engine 1008 of an LED-based light 1000. The LED-based light 1000 may be mounted in a housing like that of the LED-based light 100 in FIG. 1. The LED-based light 1000 may be used as an aircraft beacon obstruction light and may be compliant with applicable FAA and ICAO standards. The high intensity LED-based light 1000 has a base 1002 on which the light engine 1008 is mounted. The base 1002 has a circular support surface 1004 that includes a number of mounting holes 1006 for attachment to the exterior components of the LED-based light 1000 similar to those shown in FIG. 1.

The light engine 1008 has a series of concentric lighting rings 1010, 1012, 1014, and 1016 that will be detailed below. As shown in FIG. 10, the concentric lighting rings 1010, 1012, 1014 and 1016 are arrayed in a vertical stack with the concentric lighting ring 1010 at the top of the stack and the concentric ring 1016 at the bottom of the stack. The complete light engine 1008 therefore consists of four vertically stacked concentric ring assemblies 1010, 1012, 1014 and 1016 mounted to the base 1002. Of course different numbers of ring assemblies may be used such as one, two or six assemblies.

Each of the concentric lighting rings 1010, 1012, 1014 and 1016 has multiple optical elements 1020 that emit light from the entire circumference of the concentric lighting ring 1016. For example, the concentric lighting ring 1016 supports and aligns the optical elements 1020 around the entire circumference of the concentric lighting ring 1016 as shown in FIG. 10. Each of the optical elements 1020 has an LED 1022 and a reflector 1024. The base 1002 is generally cylindrical in shape and contains wiring, power supplies, and controls for the optical elements of the concentric lighting rings 1010, 1012, 1014 and 1016.

In this example, there are thirty-six (36) total optical elements 1020 in the concentric lighting ring 1016. The thirty-six (36) optical elements 1020 arrayed around the concentric lighting ring 1016 are arranged so that each optical element 1020 (LED 1022 and reflector 1024) occupies 10° of the circumference of the concentric lighting ring 1016. Of course it is to be understood that different numbers of optical elements may be used. Each reflector 1024 is designed to form a horizontal (azimuth) beam approximately 5° to 10° wide at its half-maximum intensity. In this example, the reflectors 1024 are individually constructed of molded plastic and coated with aluminum or other highly reflective material.

Each of the lighting rings 1010, 1012, 1014 and 1016 are offset from each other such that the optical elements 1020 for each of the rings are offset by 2.5 degrees. The concentric lighting rings such as rings 1010 and 1016 each have a ring shaped heat sink 1030. In this example, the ring shaped heat sink 1030 is a unitary aluminum casing. The interior surface of the heat sink 1030 has a series of upper tabs 1032 and a series of lower tabs 1034. As will be understood, the offset angle will be a function of the number of LEDs per ring and the number of rings per light engine. The particular offset angle of 2.5 degrees herein is for the exemplary case of 36 LEDs per ring and four rings 1010, 1012, 1014 and 1016 total. Each of the lower tabs 1034 has a series of alignment holes 1036 extending therethrough. The angular spacing between each of the alignment holes 1036 has been established so that by choosing one of these holes for alignment purposes during manufacturing it is possible to create offset angles between adjacent concentric rings that range from approximately 1.66 degrees to approximately 5.0 degrees. This allows use of the same ring components to assemble light engines with different numbers of LEDs and different numbers of rings. Bolts (not shown) are inserted through corresponding holes 1036 in each of the lighting rings 1010, 1012, 1014 and 1016 to offset each ring from the adjacent ring by the desired offset angle. This results in each of the optical elements 1020 in a concentric lighting ring such as the ring 1016 to be offset from each of the optical elements 1020 in the next concentric lighting ring 1014 by the desired offset, which is 2.5 radial degrees in this case.

Figure 11:
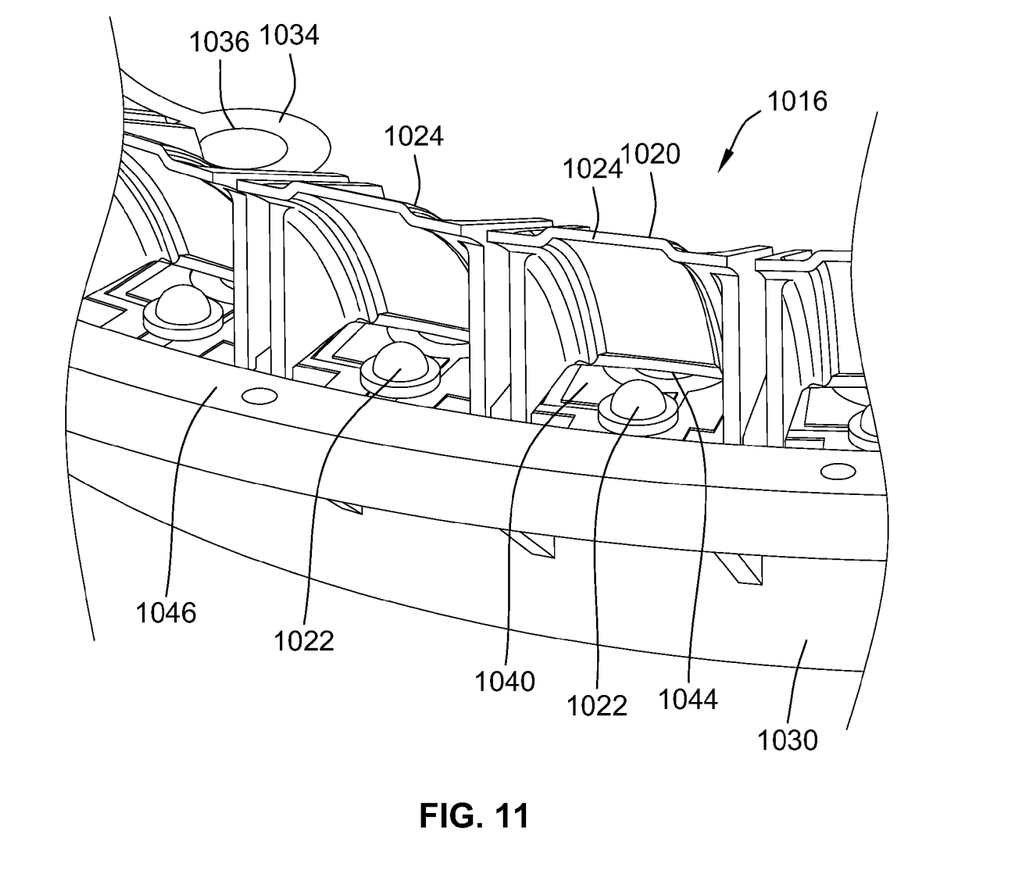
FIG. 11 is a perspective view of part of one of the concentric lighting rings of LEDs and reflectors of the high intensity light of FIG. 10.

FIG. 11 shows a close up perspective view of the lighting ring 1016. A supporting circular-segment circuit board 1040 serves to support and align each of the LEDs 1022 and the reflectors 1024. The circuit board 1040 transfers heat generated from the LEDs 1022 to the heat sink ring 1030. Heat is therefore removed from the LEDs 1022 via conduction through the printed circuit board 1040 and through the rings 1010, 1012, 1014 and 1016 to the base 1002. Heat is transferred from the base 1002 to the beacon mounting surface or transferred by convection to the ambient air.

The circuit board 1040 provides direct electrical power to the LEDs 1022 from power supplies (not shown) which may be installed in the middle of the concentric rings 1010, 1012, 1014 and 1016. A master circuit board (not shown) may be installed in the base 1002. In this example, the supporting circuit board 1040 is a thermally conductive printed circuit board (PCB), having a metal core of aluminum or copper. The LEDs 1022 are preferably attached using solder, eutectic bonding, or thermally conductive adhesive. The supporting circuit board 1040 has physical registration features that fix its radial position on the heat sink ring 1030. The supporting circuit board 1040 has a series of mounting surfaces 1044 that allow each corresponding reflector 1024 to be individually aligned or centered optically with the corresponding LEDs 1022 as will be explained below. A circular beam blocker 1046 is provided along the entire circumference of the lighting ring 1016 to prevent beams from the optical elements 1020 to project downward.

Figure 12:
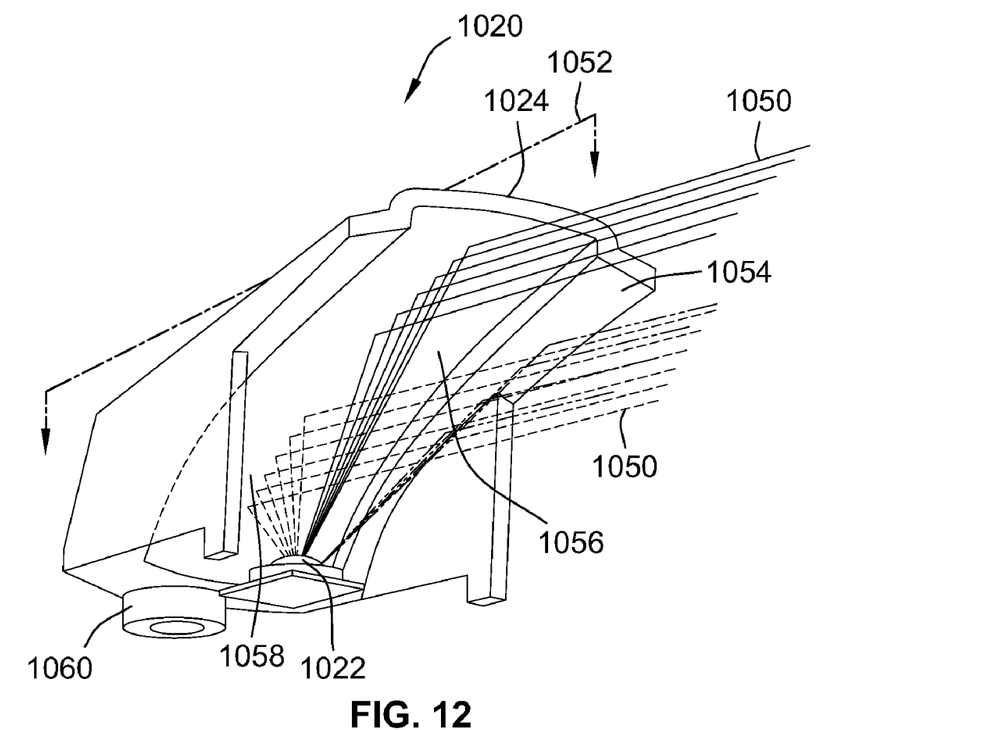
FIG. 12 is a perspective view of an optical element having a single LED and reflector mounted on one of the concentric rings of the intensity light of FIG. 10.
Figure 13:
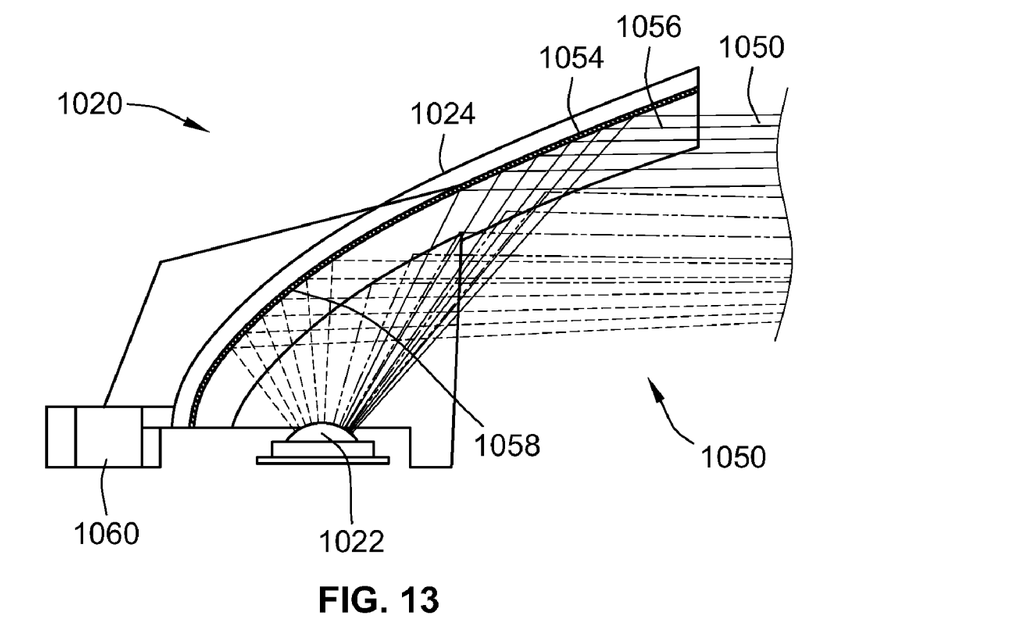
FIG. 13 is a side view of the optical element of FIG. 12.

FIG. 12 shows a perspective view and FIG. 13 shows a side view of the reflector 1024 and corresponding LED 1022 of one optical element 1020 in FIGS. 10-11. The reflector 1024 is designed using optical modeling software and a software method to optimize reflector surfaces relative to a defined merit function of the desired beam pattern. FIGS. 12 and 13 also show selected clusters of light ray traces 1050 that are emitted from the LED 1022 and reflected from the reflector 1024.

The reflector 1024 is approximately left-right symmetrical about a medial plane 1052. Each reflective "side" of the reflector 1024 includes an exterior surface zone 1054, an interior surface zone 1056 and an inset surface zone 1058. The outer surface zone 1054 is positioned relative to the interior surface zone 1056. The inset surface zone 1058 is a non-spherical concave surface inset within the interior surface zone 1056. Each surface zone 1054, 1056 and 1058 is itself a complex curved surface not amenable to simple mathematical description and without any line or plane of symmetry.

In this example, the reflectors 1024 are each physically separate and individually constructed. The materials for the reflectors 1024 may be, for example, molded plastic coated with reflective material such as aluminum. Each of the reflectors 1024 includes a mounting post 1060 that rests upon the mounting surface 1044 of the circuit board 1040 in FIG. 11. This individual construction uniquely allows each reflector 1024 to be physically moved with respect to its respective LED 1022 for optimal optical alignment of the reflector 1024 to the LED 1022. Once the desired position is made, a fastener such as a screw (not shown) may be inserted through the mounting post 1060 to secure the reflector 1024 in position. The reflectors 1024 may also be tilted by, for example, inserting strips of thin material under one of the three reflector mounting points, by selecting a reflector from a set of reflectors having different angular orientations, or other like means.

The LED-based light 1000 and corresponding light engine 1008 in FIG. 10 has several different features in comparison with the LED-based light 100 in FIG. 1. The reflector surfaces 1054, 1056 and 1058 of the reflector 1024 shown in FIGS. 13-14 have additional complex surfaces which produce a beam pattern in elevation further optimized to achieve the ICAO intensity requirements at −1° elevation at all azimuth angles. The reflector 1024 is based upon the concept of superimposed elevation beam patterns further described below.

Each reflector 1024 in FIG. 10 is physically separate and individually adjustable with its associated LED 1022. This is in contrast to the LED-based light 100 in FIG. 1 in which the reflectors are molded in arrays of six and are not adjustable with respect to the associated six LEDs. The separate beam blocker element 1046 in FIGS. 10-11 achieves the ICAO and FAA requirements at −10° that intensity of light below −10° of the horizon be less than 3% of the peak intensity at that same azimuth angle without requiring any compromise in design of the reflector optical surfaces. The circular beam blocker 1046 as shown in FIGS. 10-11 serves to eliminate stray light below −10° elevation.

The individual alignability and adjustability of the reflectors 1024 address the problem that the light emission pattern from individual LEDs, even those from the same manufacturing lot, is always slightly different. These variations in light from LEDs arise from multiple factors such as: exact location of the LED chip (die) relative to the LED package; slight angular variation (tilt) of the LED chip in the package; thickness and contour of the phosphor and encapsulant materials placed over the LED chip; precise placement and/or shape of the lens element of the LED package; exact dimensions of the LED package structures which determine LED chip location relative to the circuit board; brightness of LED output; and so on. The design of the optical elements 1020 and the reflectors 1024 recognizes that these variations are inherent to the manufacturing process and therefore must be accommodated for optimal optical performance in applications such as those with stringent beam pattern requirements.

During the manufacturing process each individual reflector 1024 is positioned (aligned) to achieve a desired beam pattern from that individual reflector and its corresponding LED. Positioning (shifting) of the reflector 1024 relative to its corresponding LED 1022 may be in one, two, or three dimensions and may also include changes in reflector angles relative to the optical axis of the LED 1022. After each reflector 1024 has been aligned it is mechanically secured so that its position and orientation will not subsequently change. Such mechanical securing may include screws, adhesives, or other similar known means. The optimal individual beam pattern is determined to produce the desired total beam pattern from the plurality of so-aligned optical elements 1020.

For ease of manufacturing all optical elements may be aligned to the same optimal individual beam pattern. However, an extension of this concept is to apply different alignment criteria to different optical elements or groups of optical elements to achieve various desirable overall beam patterns. Alternatively, the reflectors 1024 may be molded in arrays, such as a group of six reflectors, with thin flexible members connecting each reflector within the array. This reduces the costs of molding, coating, and handling the reflectors while still allowing each reflector to be shifted and angled slightly for optimal optical alignment to its respective LED.

In this example, for ease of manufacturing every reflector 1024 has the same optical surfaces. However, reflectors having different optical surfaces may be utilized to achieve various desirable overall beam patterns.

Figure 14:
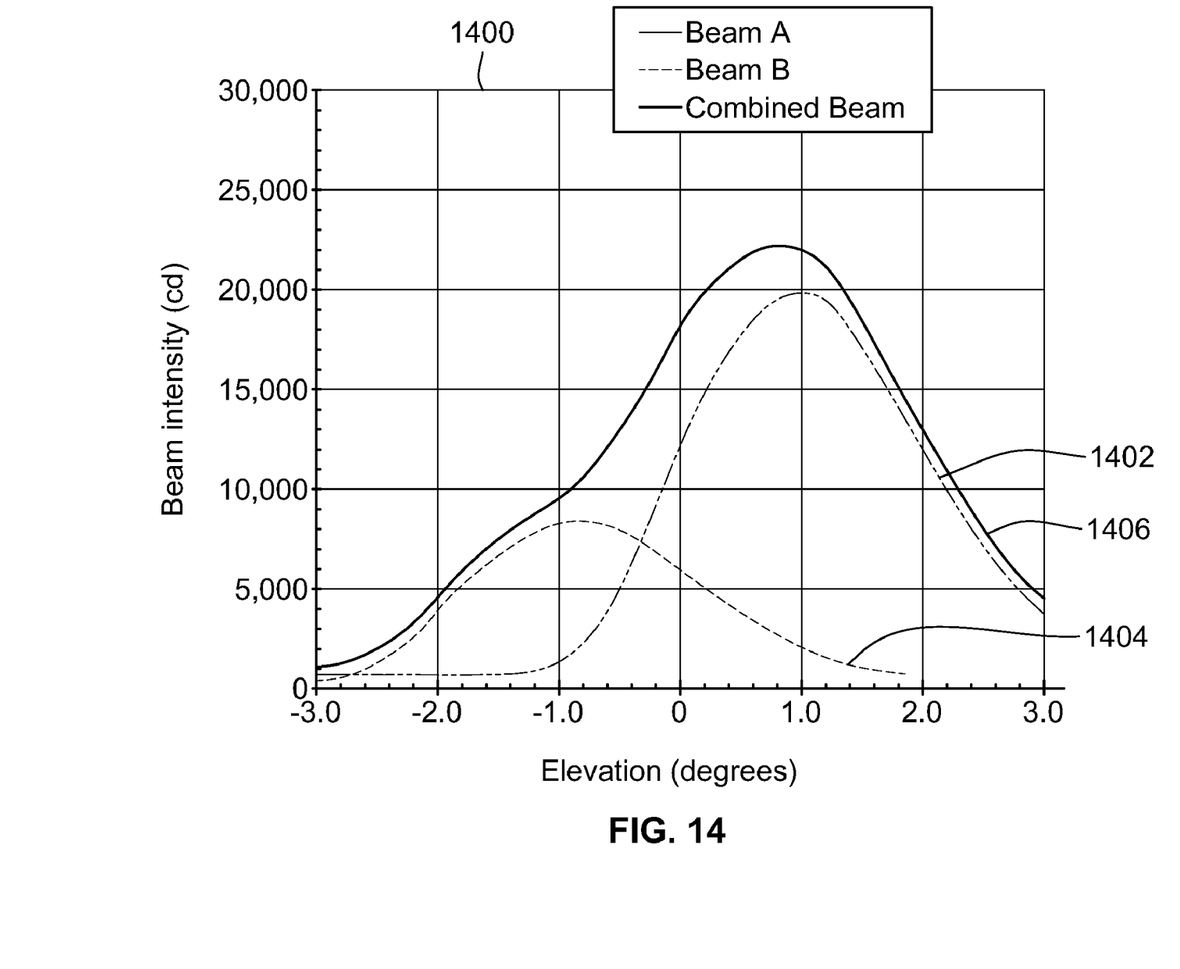
FIG. 14 is a graph of the calculated light output from an optical element of FIGS. 12-13.

An elevation beam pattern with an inflection point ("shoulder" or "step") at or near −1° elevation can fall within the −1° ICAO requirement with more tolerance for variation from the reflector 1024. The optical element 1020 produces two elevation beam patterns which then combine or sum to form the desired elevation beam pattern with inflection point at or near −1° elevation, as illustrated in the graph 1400 in FIG. 14. The x-axis in the graph 1400 is the elevation in degrees while the y-axis is the beam intensity. FIG. 14 shows the light output from a first beam 1402 and a second beam 1404 that are combined into a desired beam pattern 1406. The optical element 1020 therefore is an improvement over existing reflectors that produce an elevation beam pattern which generally rises monotonically to a peak and then falls monotonically and therefore has no inflection points and therefore the curve of the elevation beam pattern does not readily fall within the constraints of the ICAO requirements at −1° elevation.

Based upon the concept of beam pattern summation, the reflector 1024 of the lighting element 1020 creates an elevation beam pattern with a so-called "step" or "shoulder" at approximately −1° elevation which provides greater tolerance insofar as meeting the ICAO minimum-maximum intensity requirements −1°. The individually alignable reflectors 1024 allow highly precise beam patterns to be created despite variations in LED light emission characteristics. The individually alignable reflectors 1024 allow one to create different overall beam patterns using the same parts. For example, the desired overall elevation beam pattern to meet ICAO might have a peak (maximum intensity) at +2° whereas a light engine for FAA applications might have elevation beam patterns optimized with a peak at 0°, and both elevation beam patterns can be created by appropriate adjustment of reflector position and orientation. The beam blocker 1046 allows the inventive light engine 1008 to meet stray light requirements (below −10°) without undue constraints on reflector optical surface design.

The concepts and inventive matter described herein are not limited to beacon lights or obstruction lamps but may be applied to any illumination source requiring precise control of illuminating beam pattern. Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A light engine for a high intensity light comprising:
a first ring having a first plurality of reflectors and light emitting diodes, the first ring having a planar surface mounting each of the plurality of reflectors in positional relation to a respective one of the plurality of light emitting diodes, some of the plurality of reflectors being individually adjustable relative to the position of the respective light emitting diode to produce a precise beam pattern from the light emitting diode.

2. The light engine of claim 1, wherein at least one of the reflectors has a reflective side having an exterior reflective surface, an interior reflective surface and an inset reflective surface disposed on the interior reflective surface.

3. The light engine of claim 1, wherein the first ring has a circular beam blocker to prevent stray light from being emitted below a predetermined angle of elevation.

4. The light engine of claim 1, further comprising a second, third, and fourth ring, each ring having a plurality of reflectors and light emitting diodes, the second, third, and fourth rings mounted on the first ring.

5. The light engine of claim 4, further comprising a fifth ring having a plurality of reflectors and light emitting diodes, wherein the light emitting diodes of the first through fourth rings are white light emitting diodes and the light emitting diodes of the fifth ring are red light emitting diodes.

6. The light engine of claim 1, wherein the high intensity light is compliance with FAA and ICAO standards.

7. The light engine of claim 1, wherein the first ring includes a plurality of circuit boards mounting the light emitting diodes and a heat sink coupled to the plurality of circuit boards.

8. The light engine of claim 1, wherein the reflectors each include a mounting post that may be mated with a mounting surface to allow the transverse and rotational adjustment of the reflector relative to the LED.

9. The light engine of claim 1, wherein the reflectors each form a horizontal beam approximately 5 to 10 degrees wide.

10. The light engine of claim 4, where the rings are offset from each other to reduce azimuth ripple.

11. The light engine of claim 4, wherein the second ring is adjustable relative to the first concentric ring to create a different offset angle.

12. A high intensity light beacon compliant with FAA and ICAO standards, the light beacon comprising:
- a first ring having a first plurality of reflectors and light emitting diodes, the first ring having a planar surface mounting each of the plurality of reflectors in positional relation to a respective one of the plurality of light emitting diodes, each of the plurality of reflectors being individually adjustable relative to the position of the respective light emitting diode to produce a precise beam pattern from the light emitting diode;
- a second ring mounted on the first ring, the second ring having a second plurality of reflectors and light emitting diodes, the second ring having a planar surface mounting each of the plurality of reflectors in perpendicular relation to a respective one of the plurality of light emitting diodes, the second ring being rotationally offset from the first ring such that the second plurality of reflectors and light emitting diodes are staggered by a radial angle from the reflectors and light emitting diodes of the first ring;
- a third ring mounted on the second ring, the third ring having a third plurality of reflectors and light emitting diodes, the third ring having a planar surface mounting each of the plurality of reflectors in perpendicular relation to a respective one of the plurality of light emitting diodes, the third plurality of reflectors and light emitting diodes being staggered by a radial angle from the reflectors and light emitting diodes of the second ring; and
- a fourth ring mounted on the third ring, the fourth ring having a fourth plurality of reflectors and light emitting diodes, the fourth ring having a planar surface mounting each of the plurality of reflectors in perpendicular relation to a respective one of the plurality of light emitting diodes, the fourth plurality of reflectors and light emitting diodes being staggered by a radial angle from the reflectors and light emitting diodes of the third ring.

13. The light beacon of claim 12, wherein at least one of the reflectors has a reflective side having an exterior reflective surface, an interior reflective surface and an inset reflective surface disposed on the interior reflective surface.

14. The light beacon of claim 12, wherein the first, second, third and fourth rings have a circular beam blocker to prevent stray light from being emitted below a predetermined angle of elevation.

15. The light beacon of claim 12, wherein the reflectors each include a mounting post that may be mated with a mounting surface to allow the transverse and rotational adjustment of the reflectors relative to the LEDs.

16. The light beacon of claim 12, wherein the first plurality of LEDs is thirty-six LEDs and second plurality of LEDs is thirty-six LEDs.

17. The light beacon of claim 12, wherein the reflectors each form a horizontal beam approximately 5 to 10 degrees wide.

18. The light beacon of claim 12, where the offset between rings is used to reduce azimuth ripple.

19. The light beacon of claim 12, wherein the second ring is adjustable relative to the first ring to create a different offset angle.

20. An optical element for use in a light, the optical element comprising:
- a light emitting diode fixed on a mounting surface; and
- a reflector having a reflective surface, the reflective surface shaped to emit a specific beam pattern from light reflected from the light emitting diode, the reflector including a positioning member resting on the mounting surface, the positioning member allowing the reflector to be adjusted between angular positions relative to the light emitting diode on the mounting surface.

* * * * *